(12) United States Patent  (10) Patent No.: US 7,545,350 B2
Nakamura et al.  (45) Date of Patent: Jun. 9, 2009

(54) ACTIVE-MATRIX ORGANIC ELECTROLUMINESCENT DISPLAY DEVICE

(75) Inventors: Kazuo Nakamura, Kanagawa (JP); Katsuhide Uchino, Kanagawa (JP); Nobutoshi Asai, Kanagawa (JP)

(73) Assignee: Sony Corporation (JP)

( * ) Notice: Subject to any disclaimer, the term of this patent is extended or adjusted under 35 U.S.C. 154(b) by 836 days.

(21) Appl. No.: 10/982,907

(22) Filed: Nov. 8, 2004

(65) Prior Publication Data

US 2005/0099372 A1  May 12, 2005

(30) Foreign Application Priority Data

Nov. 10, 2003 (JP) ............................. 2003-379312
Mar. 4, 2004 (JP) ............................. 2004-060059

(51) Int. Cl.
*G09G 3/30* (2006.01)
(52) U.S. Cl. ........................................................ 345/81
(58) Field of Classification Search .................. 345/76, 345/77, 81, 104; 315/169.3
See application file for complete search history.

(56) References Cited

U.S. PATENT DOCUMENTS

| 5,812,109 | A | * | 9/1998 | Kaifu et al. | 345/104 |
| 5,929,845 | A | * | 7/1999 | Wei et al. | 345/156 |
| 6,747,638 | B2 | * | 6/2004 | Yamazaki et al. | 345/207 |
| 7,061,452 | B2 | * | 6/2006 | Inoue et al. | 345/76 |
| 7,190,336 | B2 | * | 3/2007 | Fujisawa | 345/81 |
| 7,348,946 | B2 | * | 3/2008 | Booth et al. | 345/82 |

FOREIGN PATENT DOCUMENTS

| JP | 2001-085160 | 3/2001 |
| JP | 2001-292276 | 10/2001 |
| JP | 2002-297096 | 10/2002 |
| JP | 2003-118164 | 4/2003 |
| WO | WO 03/058588 A2 | 7/2003 |

OTHER PUBLICATIONS

Japanese 2004-060059 Office Action Issued on Feb. 13, 2007, 3 pages.

* cited by examiner

*Primary Examiner*—Richard Hjerpe
*Assistant Examiner*—Tom V Sheng
(74) *Attorney, Agent, or Firm*—Rader Fishman & Grauer PLLC; Ronald P. Kanahen (57) ABSTRACT

An organic electroluminescent display device includes scanning lines, signal lines, and pixels formed in a matrix, each pixel being at an intersection of each of the scanning lines and each of the signal lines. Each pixel includes a light-emitting element, a light-emitting circuit composed of a thin-film transistor, and a light-receiving circuit composed of a thin-film transistor. When the light-emitting circuit is selected by the scanning line, the light-emitting circuit drives the light-emitting element according to a video signal that is input from the signal line, thereby displaying an image on the pixels formed in the matrix. The light-receiving circuit is selected in a period of time during which the light-emitting circuit does not operate, and outputs a light-receiving signal in accordance with the amount of light incident on the pixel to a different signal line.

3 Claims, 7 Drawing Sheets

ACTIVE-MATRIX ORGANIC ELECTROLUMINESCENT DISPLAY DEVICE

BACKGROUND OF THE INVENTION

1. Field of the Invention

The present invention relates to active-matrix organic electroluminescent (EL) display devices. More specifically, the present invention relates to an organic EL display device having a pixel circuit structure in which a light-emitting circuit and a light-receiving circuit for receiving information are provided for each pixel.

2. Description of the Related Art

Recently, due to the advantages of low power consumption, high response speed, and wide viewing angle, self-illuminating organic EL display devices have attracted attention as output devices. With the recent development of communication environments, high-performance displays capable of displaying motion pictures have been demanded for output devices of mobile terminals, and the use of organic EL display devices is expected. In particular, active-matrix organic EL display devices having integrated thin-film transistors as active elements have been intensively developed; these are disclosed, for example, in Japanese Unexamined Patent Application Publications No. 2001-85160, No. 2002-297096, and No. 2003-118164.

In mobile devices having input and output devices, thin-film resistance-type touch panels have been used as input devices. In a touch panel system that detects a change in potential at a touch point, it is theoretically impossible to detect more than one touch point at the same time, and therefore touch panels are not suitable for game applications. Also, a touch panel disposed on the display surface of a display device causes an increase in thickness of the device and a reduction in brightness of the display.

Recently, mobile phones equipped with a charge-coupled device (CCD) camera or a complementary metal oxide semiconductor (CMOS) camera as an input device have become widespread. Mobile phones having a built-in fingerprint sensor for use in personal authentication have also become commercially available. The sensors used as input devices are not integrally formed with an image display unit, and therefore must be incorporated in limited spaces of the mobile phones.

SUMMARY OF THE INVENTION

Accordingly, it is an object of the present invention to provide an active-matrix organic EL display device having an output device function and an input device function, thereby reducing the size of the apparatus to which it is applied.

The present invention provides an active-matrix organic electroluminescent display device including scanning lines, signal lines, and pixels formed in a matrix, each pixel being at an intersection of each of the scanning lines and each of the signal lines. Each pixel includes a light-emitting element formed of an organic electroluminescent element, a light-emitting circuit composed of a thin-film transistor, and a light-receiving circuit composed of a thin-film transistor. When the light-emitting circuit is selected by the scanning line, the light-emitting circuit drives the light-emitting element according to a video signal that is input from the signal line, thereby displaying an image on the pixels formed in the matrix. The light-receiving circuit is selected in a period of time during which the light-emitting circuit does not operate, and outputs a light-receiving signal in accordance with the amount of light incident on the pixel to a different signal line.

The light-receiving circuit may detect the amount of light incident on the light-emitting element formed on the pixel, and may output a light-receiving signal corresponding to the detected amount of light.

The light-receiving circuit may include a resetting unit that resets the light-emitting element to a reverse-bias state, and an amplification unit that amplifies a photo-leakage current that flows in the light-emitting element according to the amount of light incident on the reverse-biased light-emitting element to generate a light-receiving signal.

The light-receiving circuit may include an input switch that supplies the photo-leakage current flowing in the light-emitting element according to the amount of incident light to the amplification unit, and an output switch that reads a light-receiving signal from the amplification unit to the signal line, the light-receiving signal being obtained by amplifying the supplied photo-leakage current. The input switch and the output switch may independently be turned on and off.

The light-receiving circuit may turn off the input switch and the output switch in a period during which the light-emitting circuit operates. At non-operating time of the light-emitting circuit, the light-receiving circuit may first turn on the input switch to start supplying the photo-leakage current to the amplification unit, and then may turn on the output switch when the photo-leakage current is stably supplied.

According to the present invention, each pixel in an active-matrix organic EL display device includes a light-emitting circuit and a light-receiving circuit that are formed by integrated thin-film transistors or the like. The light-emitting circuit illuminates the organic EL element according to a video signal, thereby displaying an image. The light-receiving circuit amplifies a photo-leakage current in accordance with the amount of incident light while applying a reverse bias voltage to the organic EL element, thereby inputting image information. The organic EL display device according to the present invention can optically detect coordinate position without using a touch panel, and can also theoretically detect coordinates of more than one point at the same time. Without an additional position detecting device on a display for detecting coordinates, high-brightness image display is realized. Other than coordinate detection applications, a scanner capable of detecting light in units of pixels can be realized. Therefore, a high-value-added display device can be achieved.

DESCRIPTION OF THE PREFERRED EMBODIMENTS

Figure 1A:
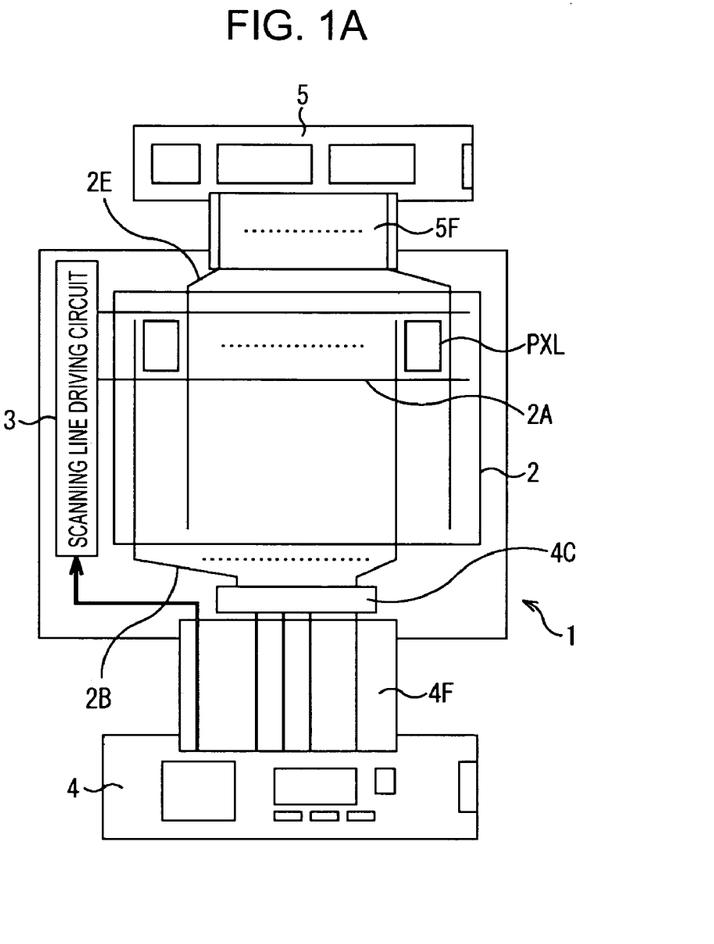
FIG. 1A is a schematic plan view of an active-matrix organic EL display device according to the present invention.
Figure 1B:
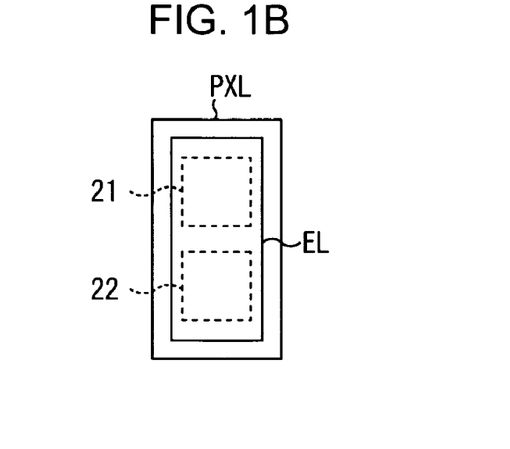
FIG. 1B is a schematic plan view of a portion of the active-matrix organic EL display device.

Embodiments of the present invention will be described in detail with reference to the drawings. FIG. 1A is a schematic plan view of an active-matrix organic EL display device 1 according to the present invention, and FIG. 1B is a schematic plan view of a portion of the display device 1. As shown in FIG. 1A, the display device 1 is a flat panel display, and includes a pixel array 2 at the center thereof. The pixel array 2 includes scanning lines 2A, signal lines 2B, and pixels PXL formed in a matrix at intersections of the scanning lines 2A and the signal lines 2B.

As shown in FIG. 1B, each pixel PXL includes a light-emitting device formed of an organic EL element (hereinafter referred to also as an "EL"), a light-emitting circuit 21 composed of a thin-film transistor, and a light-receiving circuit 22 composed of a thin-film transistor.

When the light-emitting circuit 21 is selected by the associated scanning line 2A, the light-emitting circuit 21 drives the light-emitting element (EL) according to a video signal input from the associated signal line 2B, thereby displaying an image on the pixels formed in a matrix. The light-receiving circuit 22 is selected at a non-operating time of the light-emitting circuit 21, and outputs a light-receiving signal in accordance with the amount of light incident on the pixel PXL to another signal line 2E. More specifically, the light-receiving circuit 22 detects the amount of light incident on the light-emitting element (EL) formed on the surface of the pixel PXL, and outputs a light-receiving signal corresponding to the detected amount.

In other words, in an embodiment, the light-emitting element EL also functions as a light-receiving element. The present invention is not limited to this form, and a light-receiving element may be provided separately from the light-emitting element.

The light-receiving circuit 22 connected with the EL element includes a resetting unit and an amplification unit. The resetting unit resets the light-emitting element (EL) to a reverse-bias state. The amplification unit amplifies a photo-leakage current flowing in the light-emitting element (EL) according to the amount of light incident on the reverse-biased EL element to generate a light-receiving signal.

Referring back to FIG. 1A, a scanning line driving circuit 3 is provided as a peripheral unit to the flat panel constituting the display device 1. The scanning line driving circuit 3 sequentially applies a selection pulse to the scanning lines 2A to select the pixels PXL line-by-line. A signal line driving integrated circuit (IC) 4C is provided below the flat panel. The signal line driving IC 4C drives the video signal lines 2B, and supplies video signals to the pixels PXL.

An external video signal control circuit 4 is connected to the video signal line driving IC 4C via a flat cable 4F. The video signal control circuit 4 is a substrate having an IC for supplying a required video signal to the video signal line driving IC 4C and for performing control in synchronization with the scanning line driving circuit 3.

A light-receiving signal processing circuit 5 is connected to light-receiving signal lines 2E via a flat cable 5F. The light-receiving signal processing circuit 5 is a substrate having an IC for processing a light-receiving signal. The light-receiving signal processing circuit 5 includes a current-voltage conversion circuit for converting a signal current output from each of the light-receiving signal lines 2E into a voltage signal. The light-receiving signal processing circuit 5 performs analog-to-digital (A/D) conversion on the converted voltage signal, and then performs digital data processing and necessary calculations. Thus, the information input to the flat panel can be extracted from the light-receiving signal.

Figure 2:
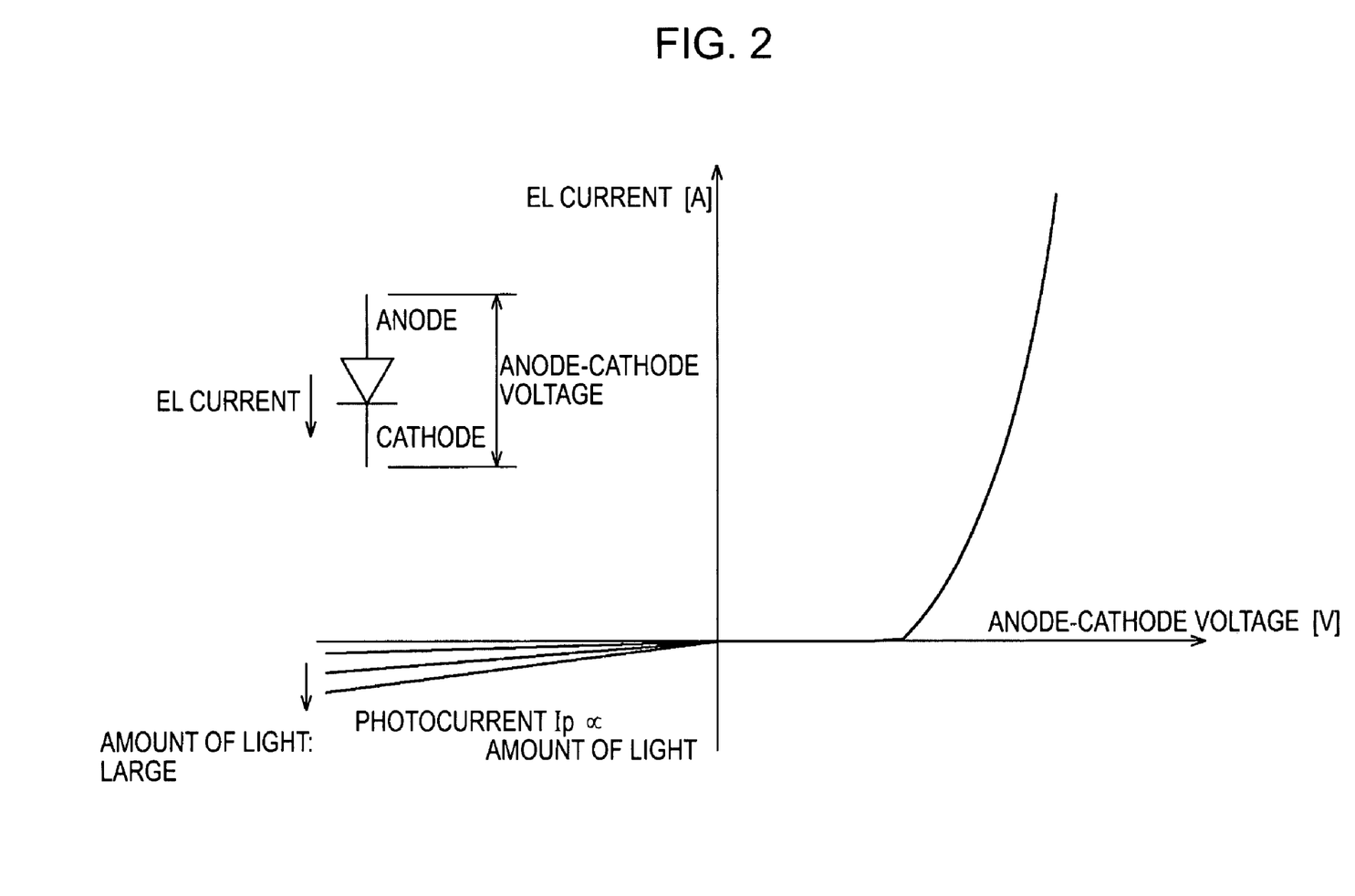
FIG. 2 is a graph showing a current-voltage characteristic of the organic EL element.

FIG. 2 is a graph showing a current-voltage characteristic of an organic EL element. The organic EL element is electrically equivalent to a diode. When an anode-cathode voltage Vak is positive (or in a forward-bias state), the EL element exhibits substantially the same characteristic as that of a diode having a threshold characteristic. As the anode-cathode voltage Vak increases, the EL current increases, and the brightness becomes high. Each light-emitting circuit causes electric current to drive the EL element using the current-voltage characteristic in the forward-bias state, and an image is displayed on the pixels formed in a matrix.

When the anode-cathode voltage Vak is negative (or in a reverse-bias state), in the EL element, carriers are generated by photo-excitation, which causes a photocurrent Ip to flow. If an applied voltage is constant, the larger the amount of light incident on the EL element, the larger the photocurrent Ip. Using this phenomenon, the light-receiving circuit resets the EL element to the reverse-bias state and amplifies the photocurrent, and a light-receiving signal is thus output to each signal line. By processing a light-receiving signal having a resolution in accordance with the pixels, information optically input to the pixel array can be detected.

Figure 3:
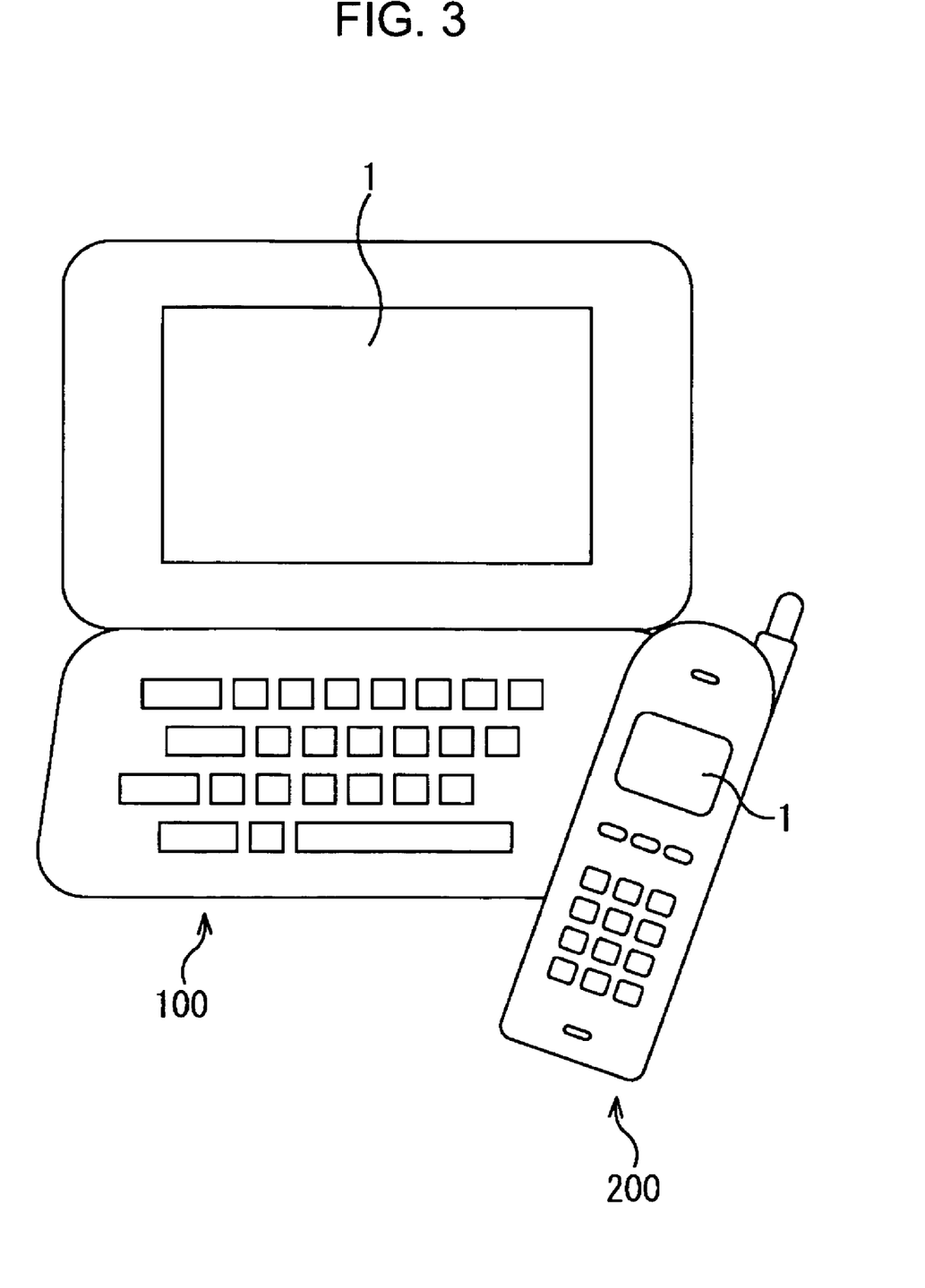
FIG. 3 is a schematic diagram of applications of the active-matrix organic EL display device according to the present invention.

FIG. 3 is a diagram of a portable personal terminal 100 and a mobile phone 200 according to applications of the present invention. When the portable personal terminal 100 is open, the organic EL display device 1 is provided as an output device in the center of the portable personal terminal 100. The organic EL display device 1 functions as a display and as an input device. For example, when a finger is close to the surface of the flat panel, a finger shadow is detected, and the corresponding coordinate data is input. This display panel allows direct coordinate input without using a touch panel. The coordinate data is read by the pixel array, and the coordinate data of a plurality of points can be input at the same time, which is suitable for game applications. In this case, the light-emitting circuit and the light-receiving circuit are driven in a time-shared manner to display a game screen and input coordinate data at the same time.

The flat panel may also be used as a scanner. When an object is brought in close proximity to the surface of the flat panel, the pixel array is scanned to read an image of the object. In this case, the image information is read by scanning only the light-receiving circuit while stopping the driving of the light-emitting circuit.

Due to the high packaging density, a flat panel functioning as an output device and an input device is advantageous when incorporated into a display of the mobile phone 200.

Figure 4:
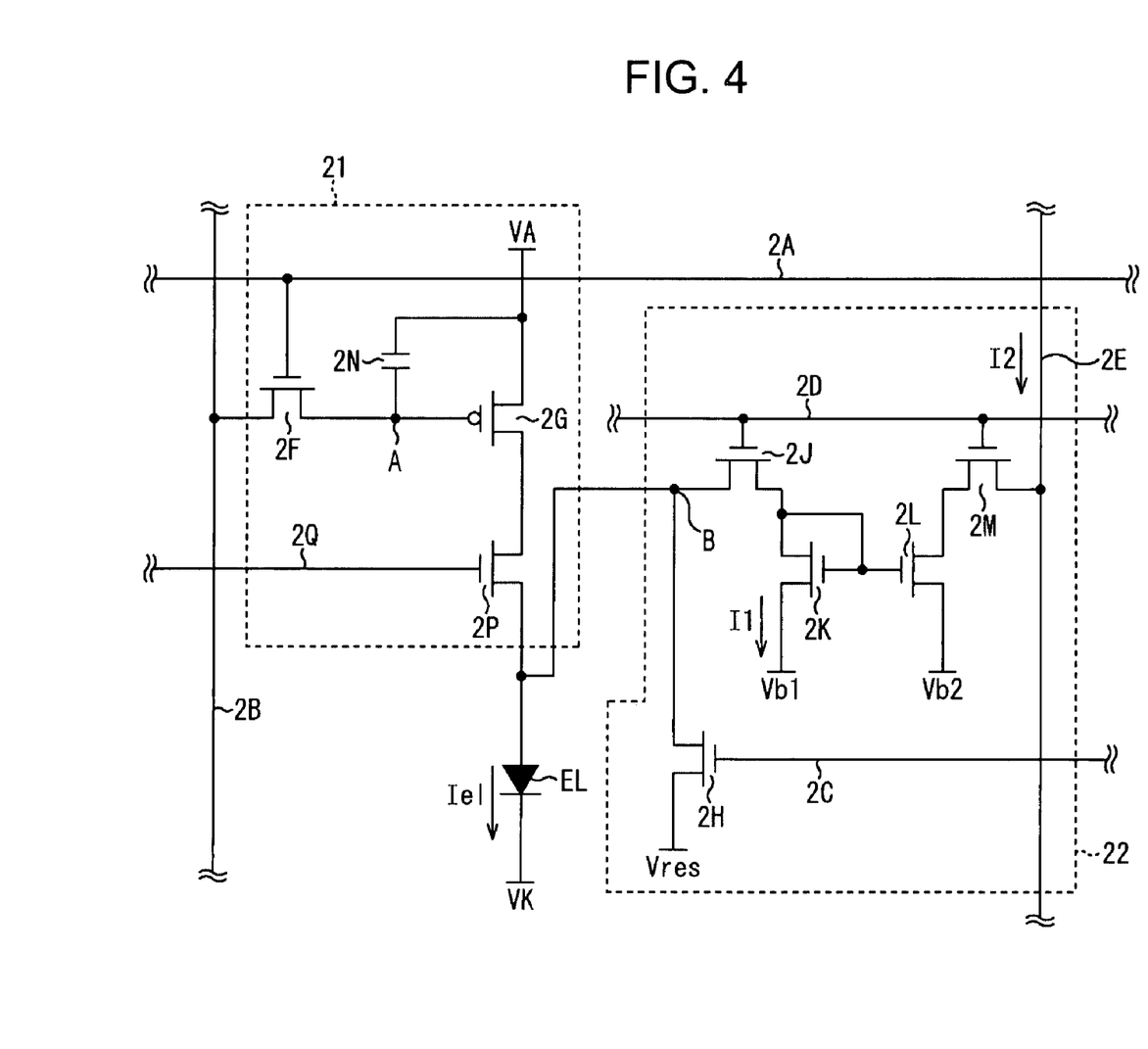
FIG. 4 is a circuit diagram of a pixel circuit in the active-matrix organic EL display device according to a first embodiment of the present invention.

FIG. 4 is a circuit diagram of the pixel circuit shown in FIG. 1B according to a first embodiment of the present invention. The light-emitting circuit 21 is disposed at an intersection of the scanning line 2A and the video signal line 2B, and drives the EL element. The light-emitting circuit 21 is connected to an illumination control line 2Q. The illumination control line 2Q is driven by the scanning line driving circuit 3 or a different driving circuit. The EL element is also connected with the light-receiving circuit 22. A signal output from the light-receiving circuit 22 is supplied to the light-receiving signal line 2E. The light-receiving signal line 2E is parallel to the video signal line 2B. The video signal line 2B and the light-receiving signal line 2E may be shared and used in a time-shared manner by the light-emitting circuit 21 and the light-receiving circuit 22. The light-receiving circuit 22 is connected to a light-receiving control line 2D and a reset control line 2C. The control lines 2C and 2D are driven by the scanning line driving circuit 3 or a different driving circuit.

The specific structure of the light-emitting circuit 21 and the light-receiving circuit 22 will now be described.

The light-emitting circuit 21 includes a thin-film transistor (n-channel TFT) 2F at an intersection of the scanning line 2A and video signal line 2B, which are orthogonal to each other, for sampling a video signal. The sampling thin-film transistor 2F has a gate connected with the scanning line 2A and a drain connected with the associated video signal line 2B. A source of the sampling thin-film transistor 2F is connected at a node A with one electrode of a storage capacitor 2N and a gate of a driving thin-film transistor (p-channel TFT) 2G. A source of the driving thin-film transistor 2G is connected with the other electrode of the storage capacitor 2N and an anode power supply VA for illumination. A drain of the driving thin-film transistor 2G is connected with a thin-film transistor (n-channel TFT) 2P for controlling illumination. A source of the illumination control thin-film transistor 2P is connected with an anode of the organic EL element. A cathode of the organic EL element is connected with a cathode power supply VK. A gate of the illumination control thin-film transistor 2P is controlled by the illumination control line 2Q.

In the light-receiving circuit 22, the light-receiving control (read control line) 2D and the light-receiving signal line 2E are orthogonal to each other. The read control line 2D is connected with a gate of a thin-film transistor (n-channel TFT) 2J for controlling a current input to the EL element and a gate of a thin-film transistor (n-channel TFT) 2M for controlling the output of the light-receiving signal. A drain of the thin-film transistor 2J is connected at a node B with the anode of the organic EL element and a drain of a thin-film transistor (n-channel TFT) 2H for controlling resetting. A source of the reset control thin-film transistor 2H is connected with a reset power supply Vres, and a gate is connected with the reset control line 2C.

An n-channel thin-film transistor 2K and an n-channel thin-film transistor 2L constitute a current mirror circuit. An EL current I1 at the time of receiving light is input to a drain and gate of the thin-film transistor 2K of the current mirror circuit via the thin-film transistor 2J, and is caused to flow in a bias power supply Vb1 via a source of the thin-film transistor 2K. The light-receiving current I1 defines the gate potential of the thin-film transistor 2L of the current mirror circuit, and a light-receiving current I2 is thus caused to flow in a bias power supply Vb2 via the thin-film transistors 2M and 2L.

If the thin-film transistors (TFTs) 2K and 2L of the current mirror circuit operate in a saturation region when light is received, the EL current I1 at the time of receiving light and the light-receiving current I2 are given by the following equations:

$$I1 = k1 \cdot (Vg - Vb1 - Vth1)^2 \quad \text{Eq. (1)}$$

$$I2 = k2 \cdot (Vg - Vb2 - Vth2)^2 \quad \text{Eq. (2)}$$

where k1 denotes the size factor of the TFT 2K, Vth1 denotes a threshold voltage of the TFT 2K, k2 denotes the size factor of the TFT 2L, Vth2 denotes a threshold voltage of the TFT 2L, and Vg denotes a gate voltage of the TFTs 2K and 2L.

When Eqs. (1) and (2) are rearranged, the light-receiving current I2 is given by the following Eq. (3):

$$I2 = k2 \cdot ((I1/k1)^{1/2} + Vb1 - Vb2 + Vth1 - Vth2)^2 \quad \text{Eq. (3)}$$

If a uniform TFT characteristic is exhibited in one pixel, Eq. (3) is simplified to Eq. (4) as follows:

$$I2 = k2 \cdot ((I1/k1)^{1/2} + Vb1 - Vb2)^2 \quad \text{Eq. (4)}$$

As can be seen from Eq. (4), I2 is represented by a monotonic increasing function of the EL current I1 at the time of receiving light.

As described above with reference to FIG. 2, when the anode-cathode voltage Vak of the organic EL element is negative, in the organic EL element, carriers are generated by photo-excitation, which causes the photocurrent Ip to flow. The photocurrent Ip is substantially in linear proportion to the amount of incident light. Therefore, substituting I1=Ip in Eq. (4), the following Eq. (5) is determined:

$$I2 = k2 \cdot ((Ip/k1)^{1/2} + Vb1 - Vb2)^2 \quad \text{Eq. (5)}$$

As is apparent from Eq. (5), the light-receiving current I2 is represented by a monotonic increasing function of the amount of received light, and light can be detected in units of pixels. The light-receiving current I2 can be appropriately adjusted by changing the size factor of the TFTs 2K and 2L and the voltages of the bias power supplies Vb1 and Vb2. Therefore, the rate of amplification of the current mirror circuit constituted by the TFTs 2K and 2L can appropriately be determined by adjusting these parameters.

Figure 5:
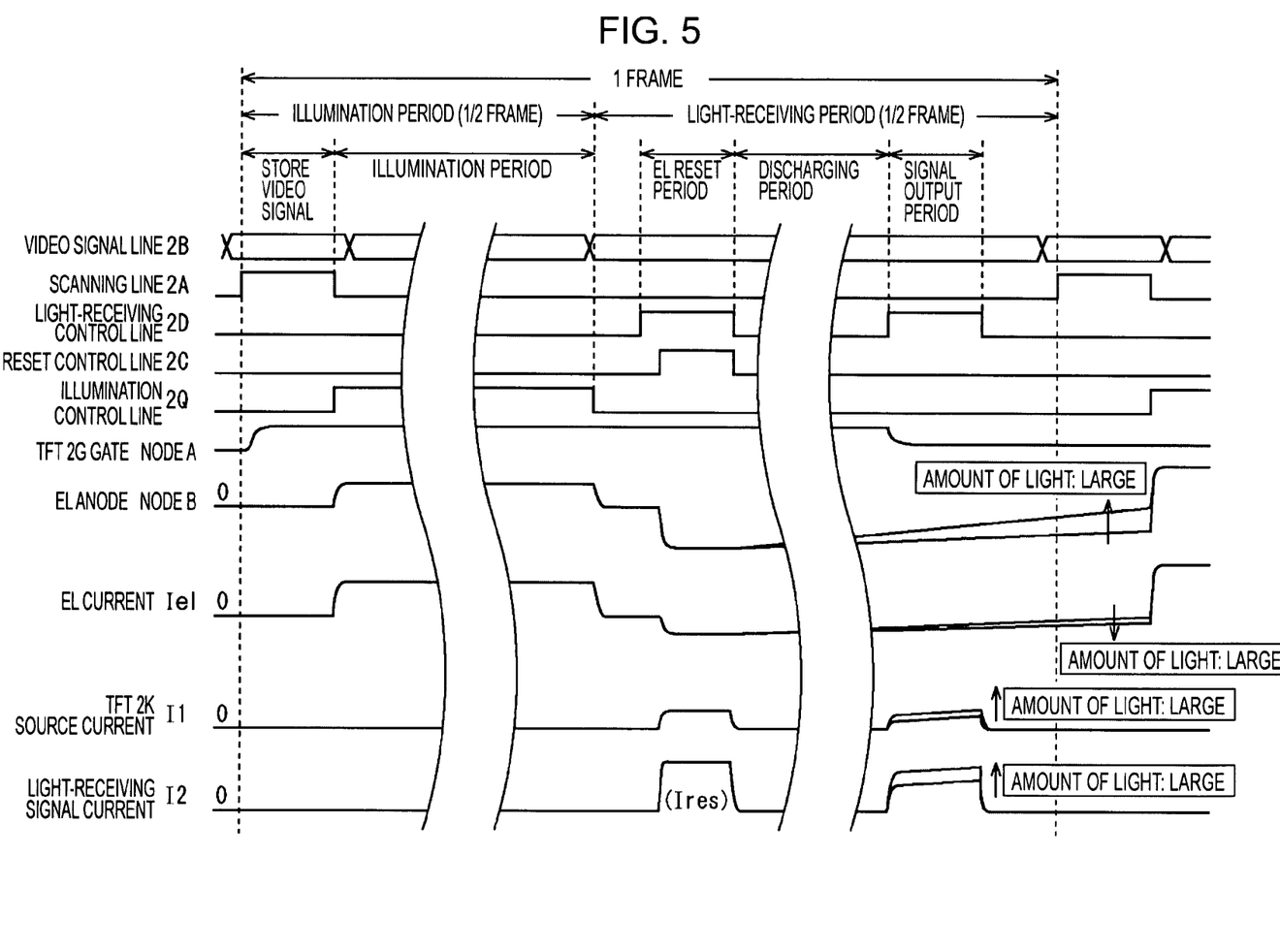
FIG. 5 is a timing chart showing the operation of the pixel circuit shown in FIG. 4.

FIG. 5 is a timing chart showing the operation of the pixel circuit shown in FIG. 4. In the first embodiment, one frame is divided into the first half period indicating an illumination period, and the second half period indicating a light-receiving period in order to perform time-shared control. FIG. 5 shows waveforms of control signals applied to the video signal line 2B, the scanning line 2A, the light-receiving control line 2D, the reset control line 2C, and the illumination control line 2Q. FIG. 5 further shows a change in potential at the node A connected to the gate of the TFT 2G and the node B connected to the anode of the organic EL element. FIG. 5 further shows the current waveforms of the EL current Iel flowing in the organic EL element, the source current I1 of the TFT 2K, and the light-receiving signal current I2.

In the illumination operation, when a selection pulse is applied to the scanning line 2A so as to become a high level, the sampling thin-film transistor 2F is turned on, and the video signal supplied from the video signal line 2B is stored in the storage capacitor 2N. Thus, the potential at the node A increases to the level corresponding to the video signal. Then, when the illumination control line 2Q is changed to a high level, the illumination control thin-film transistor 2P is turned on, and a driving current is supplied to the organic EL element via the driving thin-film transistor 2G and the illumination control thin-film transistor 2P to emit light according to the video signal level. That is, the anode voltage of the EL element increases according to the video signal, and a forward current is caused to flow in the organic EL element. For this period, the light-receiving control line 2D is at a low level, and the input control thin-film transistor 2J in the light-receiving circuit 22 is cut off. This does not cause a current to flow in the thin-film transistor 2K of the mirror circuit, and does not cause the light-receiving current I2 to flow.

In the light-receiving operation, the illumination control line 2Q is turned off to terminate illumination. Then, the light-receiving control line 2D becomes a high level and the reset control line 2C is also changed to a high level. Thus, the organic EL element is charged to a certain potential Vres via the reset thin-film transistor 2H. This potential is a reverse-bias potential so that the organic EL element does not emit light. For example, if the cathode voltage Vk is 0 V, the reset voltage Vres is set to about −5 V. At this time, although the current I2 flows to the bias power supply Vb2 via the thin-film transistors 2M and 2L, the value of the current I2 corresponds to the reset voltage Vres, and does not rely on the intensity of the incident light.

After the organic EL element EL is reset to the reverse bias state, the light-receiving control line 2D is returned to the low level. Thus, the TFTs 2J and 2M are turned off, and the charge of the organic EL element stored in the EL thin film is discharged. Due to this discharging, the anode voltage (the voltage at the node B) gradually increases. The discharging period is necessary for setting the anode potential up to about the operation point of the current mirror circuit because the photo-leakage current is weak.

Then, in the signal output period, the light-receiving control line 2D is again changed to the high level, and the TFTs 2J and 2M are turned on, while the reset control line 2C is maintained at the off level. This causes the light-receiving current I2 given by Eq. (5) to flow in the light-receiving signal line 2E. The light-receiving current I2 depends upon the amount of light received by the organic EL element.

The light-receiving current I2 is converted into a voltage signal by the current-voltage conversion circuit connected to the light-receiving signal line 2E, and is further analog-to-digital converted for digital processing.

A light-receiving current Ires that flows in the reset operation is determined depending not upon the incident light but upon variations of current mirror circuits and organic EL elements. Thus, the difference between the light-receiving current I2 externally obtained in the signal output period and the light-receiving current Ires flowing in the reset period allows a fixed noise pattern caused by variations in the TFTs to be canceled.

Figure 6:
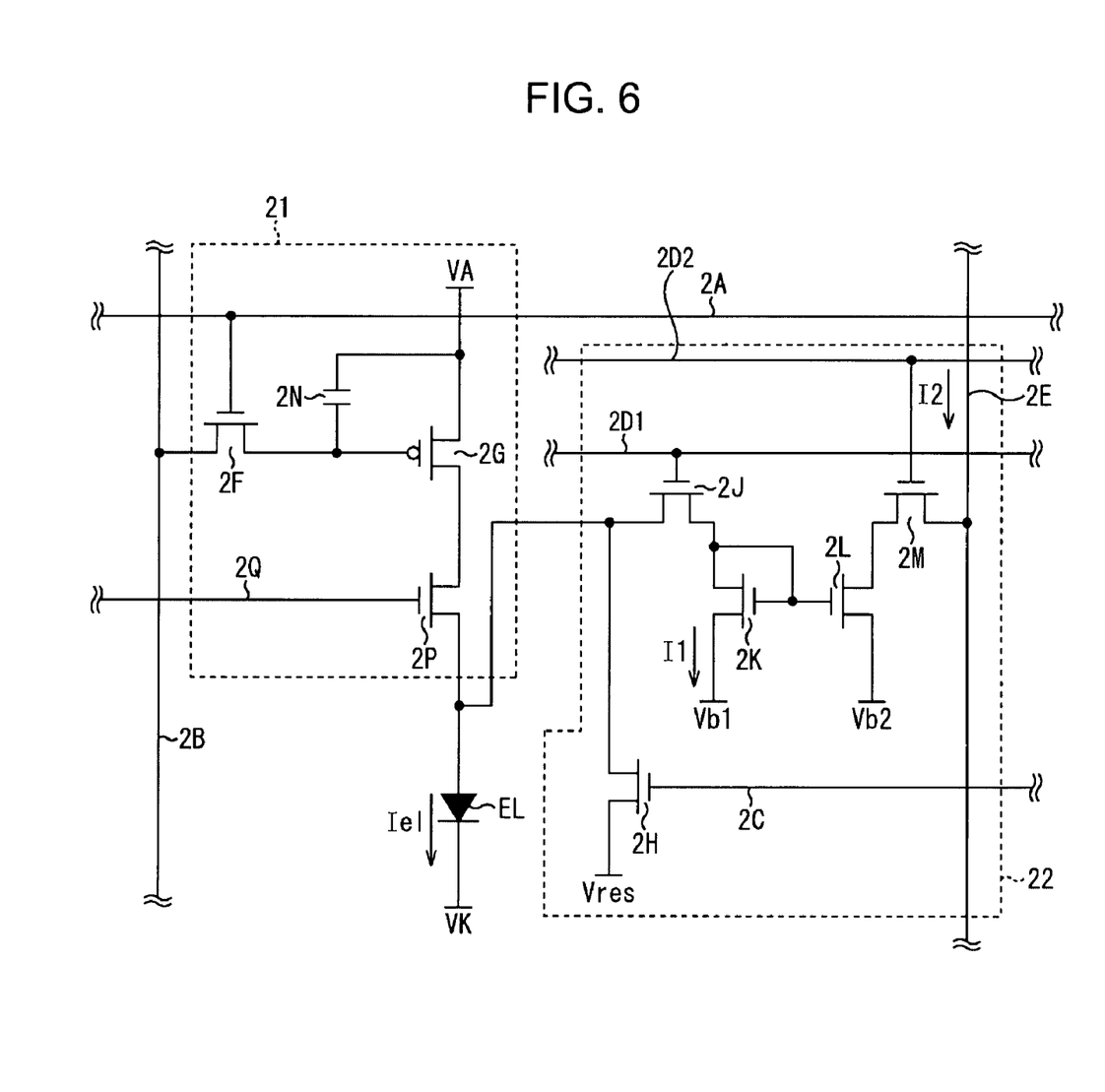
FIG. 6 is a circuit diagram of a pixel circuit in the active-matrix organic EL display device according to a second embodiment of the present invention.

FIG. 6 is a circuit diagram of the pixel circuit shown in FIG. 1B according to a second embodiment of the present invention. In FIG. 6, for ease of illustration, the same reference numerals are given to the portions corresponding to those shown in FIG. 4.

As shown in FIG. 6, in a light-emitting circuit 21 of each pixel, an n-channel TFT 2F for sampling a video signal is disposed at an intersection of a scanning line 2A and a video signal line 2B orthogonal to each other. The video-signal sampling n-channel TFT 2F has a gate connected with the scanning line 2A, and a drain connected with the video signal line 2B. A source of the video-signal sampling n-channel TFT 2F is connected with a storage capacitor 2N and a gate of a driving p-channel TFT 2G. A source of the driving p-channel TFT 2G is connected with the storage capacitor 2N and an anode power supply VA for illumination. A drain of the driving p-channel TFT 2G is connected with an n-channel TFT 2P for controlling illumination. A source of the illumination control n-channel TFT 2P is connected with an anode of the organic EL element. A cathode of the organic EL element is connected with a cathode power supply VK.

In a light-receiving circuit 22 of each pixel, a light-receiving input control line 2D1 and a light-receiving output control line 2D2 are orthogonal to a light-receiving signal line 2E. The light-receiving input control line 2D1 is connected to a gate of an n-channel TFT 2J for controlling the input of a light-receiving current, and the light-receiving output control line 2D2 is connected with a gate of an n-channel TFT 2M for controlling the output of a light-receiving signal. A drain of the EL current input control n-channel TFT 2J is connected with the anode of the organic EL element and a drain of a reset control n-channel TFT 2H. A source of the reset control n-channel TFT 2H is connected with a reset power supply Vres, and a gate of the reset control n-channel TFT 2H is connected with a reset control line 2C. An n-channel TFT 2K and an n-channel TFT 2L constitute a current mirror circuit. An EL current I1 at the time of receiving light is input to a drain and gate of the n-channel TFT 2K of the current mirror circuit via the EL current input control n-channel TFT 2J, and is caused to flow in a bias power supply Vb1 via a source of the n-channel TFT 2K.

The organic EL element functions as a light-emitting element and a light-receiving element. As is apparent from the optical dependency of the current-voltage characteristic of the organic EL element shown in FIG. 2, when the anode-cathode voltage Vak is positive, the organic EL element exhibits substantially the same characteristic as that of a diode having a threshold characteristic, and the characteristic does not change depending upon the incident light. When the anode-cathode voltage Vak is negative, due to the carriers generated by photo-excitation, a photocurrent Ip is caused to flow in the EL element, thus exhibiting the same characteristic as that of a photodiode. In the present invention, as described above, light is detected using an optical response of the reverse-biased organic EL element.

Figure 7:
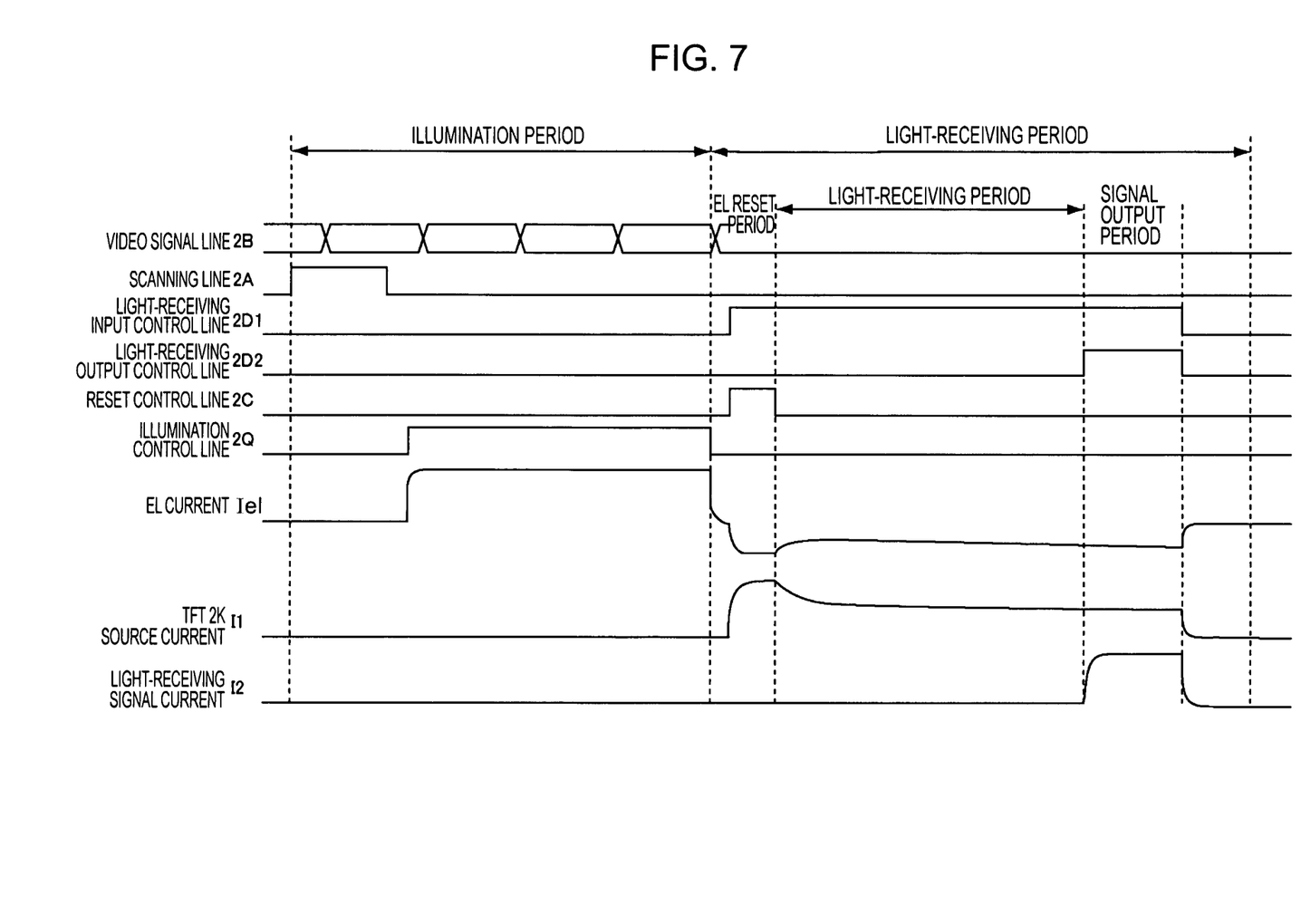
FIG. 7 is a timing chart showing the operation of the pixel circuit shown in FIG. 6.

FIG. 7 is a timing chart showing the operation of the pixel circuit shown in FIG. 6. In the second embodiment, one frame is divided into the first half period indicating an illumination period, and the second half period indicating a light-receiving period.

In the illumination operation, the scanning line 2A becomes a high level, and a video signal is stored in the storage capacitor 2N. Then, the illumination control switch 2P is turned on to emit light. At this time, the anode voltage of the EL element increases according to the video signal, and a forward current is caused to flow in the EL element. The TFT-2J is cut off. This does not cause a current to flow in the TFT 2K, and does not cause the light-receiving current I2 to flow.

In the light-receiving operation, the illumination control line 2Q is turned off to terminate illumination. Then, the reset control line 2C and the light-receiving input control line 2D1 are turned on, and the EL thin film of the organic EL element is charged to a certain reset potential to clear the charges applied in the illumination operation. This potential is a reverse-bias potential so that the EL element does not emit light. For example, if the cathode voltage VK is 0 V, the reset voltage Vres is set to about −5 V. At this time, the light-receiving signal current I2 corresponding to the reset voltage Vres flows, and does not rely on the intensity of the incident light. Then, in the light-receiving period, the reset control line 2C and the light-receiving output control line 2D2 are turned off, and the light-receiving input control line 2D1 is turned on. For this period, the reverse-bias potential Vb1 is applied to the EL element via the TFTs 2K and 2J, a photo-excitation current determined by the reverse-bias potential Vb1 and the incident light is caused to flow. In the output reading period after the photo-excitation current stably flows, the light-receiving output control line 2D2 is turned on, and the read current I2 that is amplified by the current mirror circuit constituted by the TFTs 2K and 2L is output to the outside.

In this system, a constant reverse-bias potential is constantly applied to the EL element for a light-receiving period, and high sensitivity can be realized.

As in the pixel circuit shown in FIG. 4, also in the pixel circuit shown in FIG. 6, the light-receiving circuit 22 includes a resetting unit that resets the light-emitting element EL to a reverse-bias state, and an amplification unit that amplifies a photo-leakage current I1 flowing in the light-emitting element EL according to the amount of light incident on the reverse-biased EL element to generate a light-receiving signal I2.

As in the first embodiment, also in the second embodiment, the amplification unit is composed of a current mirror circuit constituted by the TFTs 2K and 2L. The light-receiving circuit 22 also includes the input switch 2J that supplies the photo-leakage current I1 flowing in the light-emitting element EL to the amplification unit according to the amount of incident light, and the output switch 2M that reads the light-receiving signal I2 obtained by amplifying the supplied photo-leakage current I1 from the amplification unit to the signal line 2E. A feature of the second embodiment is that the input switch 2J and the output switch 2M are independently turned on and off by the separate control lines 2D1 and 2D2.

More specifically, as shown in the timing chart shown in FIG. 7, the input switch 2J and the output switch 2M of the light-receiving circuit 22 are turned off in the operating time of the light-emitting circuit 21. In the non-operating time of the light-emitting circuit 21, the input switch 2J is first turned on to start supplying the photo-leakage current I1 to the amplification unit, and the output switch 2M is then turned on when the photo-leakage current I1 is stably supplied.

In the first embodiment descried above with reference to FIG. 4, on the other hand, in light-receiving control, the reset control line 2C and the light-receiving control line 2D are first turned on to apply a reverse-bias potential to the EL element capacitor. At this time, a current corresponding to the reset potential is caused to flow in the light-receiving signal line 2E. After resetting, the reset control line 2C and the light-receiving control line 2D are turned off. In the light-receiving period, the charge stored in the EL element due to photo-leakage is discharged. In the reading period, the light-receiving control line 2D is turned on to determine the operation point of the current mirror circuit based on the amount of charge discharged in the light-receiving period, and a light-receiving signal is output. In the first embodiment, the EL element is reverse-biased only in the reset period and the reading period. Moreover, due to photo-excitation that causes EL charge to be discharged, the source-drain potential of the TFT 2J is finally reduced in the reading operation, and the sensitivity is low.

In the second embodiment described with reference to FIG. 6, on the other hand, the reverse bias Vb1 is constantly applied to the EL element in the light-receiving period. Therefore, a more stable high-sensitivity light-receiving signal can be obtained.

What is claimed is:

1. An active-matrix organic electroluminescent display device comprising:
    scanning lines;
    signal lines; and
    pixels formed in a matrix, each pixel being at an intersection of each of the scanning lines and each of the signal lines,
    wherein each pixel includes a light-emitting element comprising an organic electroluminescent element, a light-emitting circuit comprising a thin-film transistor, and a light-receiving circuit comprising a thin-film transistor,
    when the light-emitting circuit is selected by the scanning line, the light-emitting circuit drives the light-emitting element according to a video signal that is input from the signal line, thereby displaying an image on the pixels formed in the matrix, and
    the light-receiving circuit is selected in a period of time during which the light-emitting circuit does not operate, and outputs a light-receiving signal in accordance with the amount of light incident on the pixel to a different signal line, wherein the light-receiving circuit includes a resetting unit that resets the light-emitting element to a reverse-bias state, and an amplification unit that amplifies a photo-leakage current that flows in the light-emitting element according to the amount of light incident on the reverse-biased light-emitting element to generate a light-receiving signal,
    wherein the light-receiving circuit includes:
    an input switch that supplies the photo-leakage current flowing in the light-emitting element according to the amount of incident light to the amplification unit; and
    an output switch that reads a light-receiving signal from the amplification unit to the signal line, the light-receiving signal being obtained by amplifying the supplied photo-leakage current and the input switch and the output switch are independently turned on and off.

2. The device according to claim 1, wherein the light-receiving circuit detects the amount of light incident on the light-emitting element formed on the pixel, and outputs a light-receiving signal corresponding to the detected amount of light.

3. The device according to claim 1, wherein the light-receiving circuit turns off the input switch and the output switch in a period during which the light-emitting circuit operates, and at non-operating time of the light-emitting circuit, the light-receiving circuit first turns on the input switch to start supplying the photo-leakage current to the amplification unit, and then turns on the output switch when the photo-leakage current is stably supplied.

* * * * *